(12) United States Patent
Wakiyama et al.

(10) Patent No.: US 8,587,817 B2
(45) Date of Patent: Nov. 19, 2013

(54) IMAGE PROCESSING APPARATUS, IMAGE PROCESSING METHOD, AND COMPUTER READABLE MEDIUM STORING PROGRAM

(75) Inventors: Tetsuya Wakiyama, Kanagawa (JP); Toshiyuki Yamada, Kanagawa (JP); Kiyotaka Tsuchibuchi, Kanagawa (JP); Junichi Shimizu, Kanagawa (JP); Hiroshi Niina, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 87 days.

(21) Appl. No.: 13/230,384

(22) Filed: Sep. 12, 2011

(65) Prior Publication Data

US 2012/0250107 A1 Oct. 4, 2012

(30) Foreign Application Priority Data

Mar. 28, 2011 (JP) ................................. 2011-069573

(51) Int. Cl.
*G06K 15/00* (2006.01)

(52) U.S. Cl.
USPC ........................... 358/1.16; 358/1.15; 358/1.1

(58) Field of Classification Search
None
See application file for complete search history.

(56) References Cited

U.S. PATENT DOCUMENTS

| 2003/0016390 | A1* | 1/2003 | Yuasa | 358/1.16 |
|---|---|---|---|---|
| 2004/0143794 | A1* | 7/2004 | Sugimoto et al. | 715/526 |
| 2006/0193008 | A1* | 8/2006 | Osaka et al. | 358/1.18 |
| 2008/0043256 | A1* | 2/2008 | Broda et al. | 358/1.3 |
| 2009/0154833 | A1* | 6/2009 | Sakaue et al. | 382/282 |

FOREIGN PATENT DOCUMENTS

| JP | 05-342408 | A | 12/1993 |
|---|---|---|---|
| JP | 08-044827 | A | 2/1996 |
| JP | 09-128480 | A | 5/1997 |
| JP | 2002-073598 | A | 3/2002 |
| JP | 2003-288334 | A | 10/2003 |
| JP | 2005-128925 | A | 5/2005 |

* cited by examiner

*Primary Examiner* — Tammy Pham
*Assistant Examiner* — Idowu O Osifade
(74) *Attorney, Agent, or Firm* — Sughrue Mion, PLLC

(57) ABSTRACT

An image processing apparatus includes a header acquiring part, a table connection determining part, and a table connecting part. The header acquiring part acquires a header from a table, having rows and columns, included in each of plural pieces of image data arranged in a predetermined order. The table connection determining part determines whether the headers acquired from the tables match one another and determines, as a set of tables to be connected, adjacent tables having the matching headers. The table connecting part deletes the header from each of one or more second tables and connects a first table and the one or more second tables to each other in accordance with the predetermined order. The first table is included in a first piece of pieces of image data of the determined set of tables in the predetermined order.

14 Claims, 16 Drawing Sheets

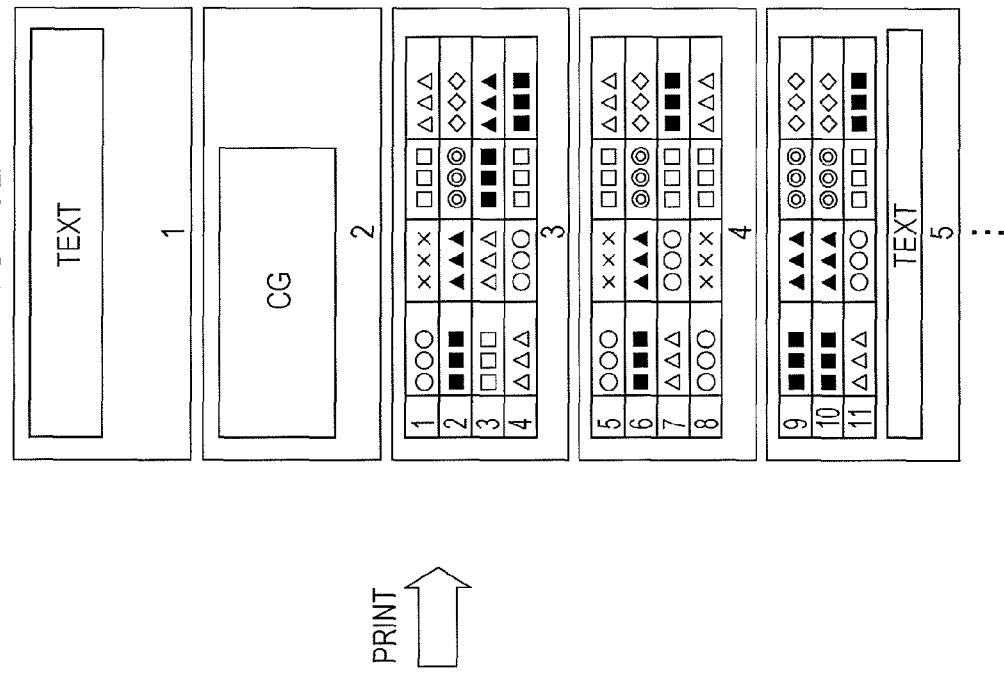
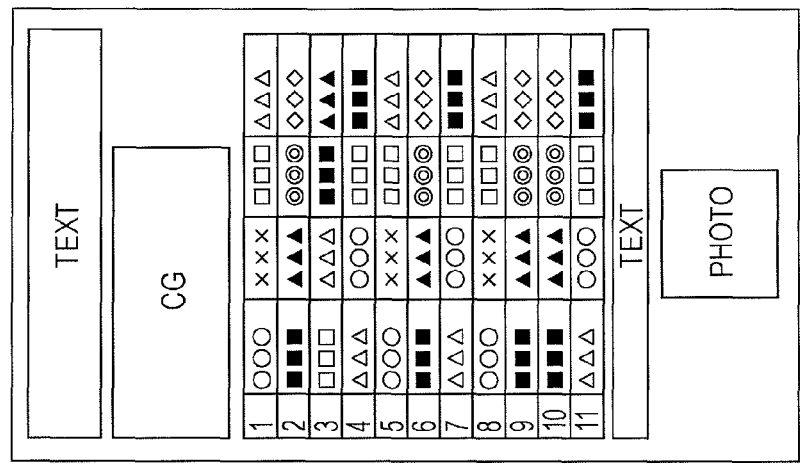

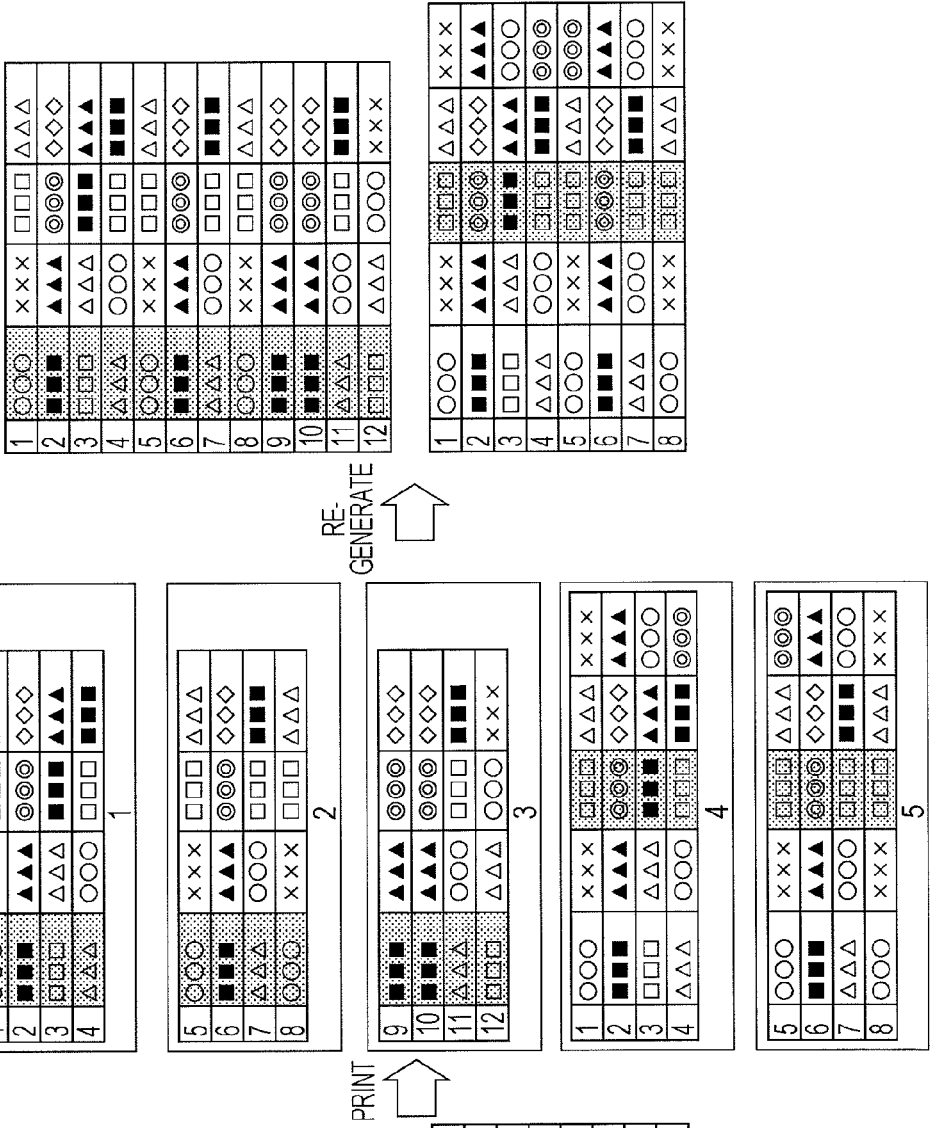

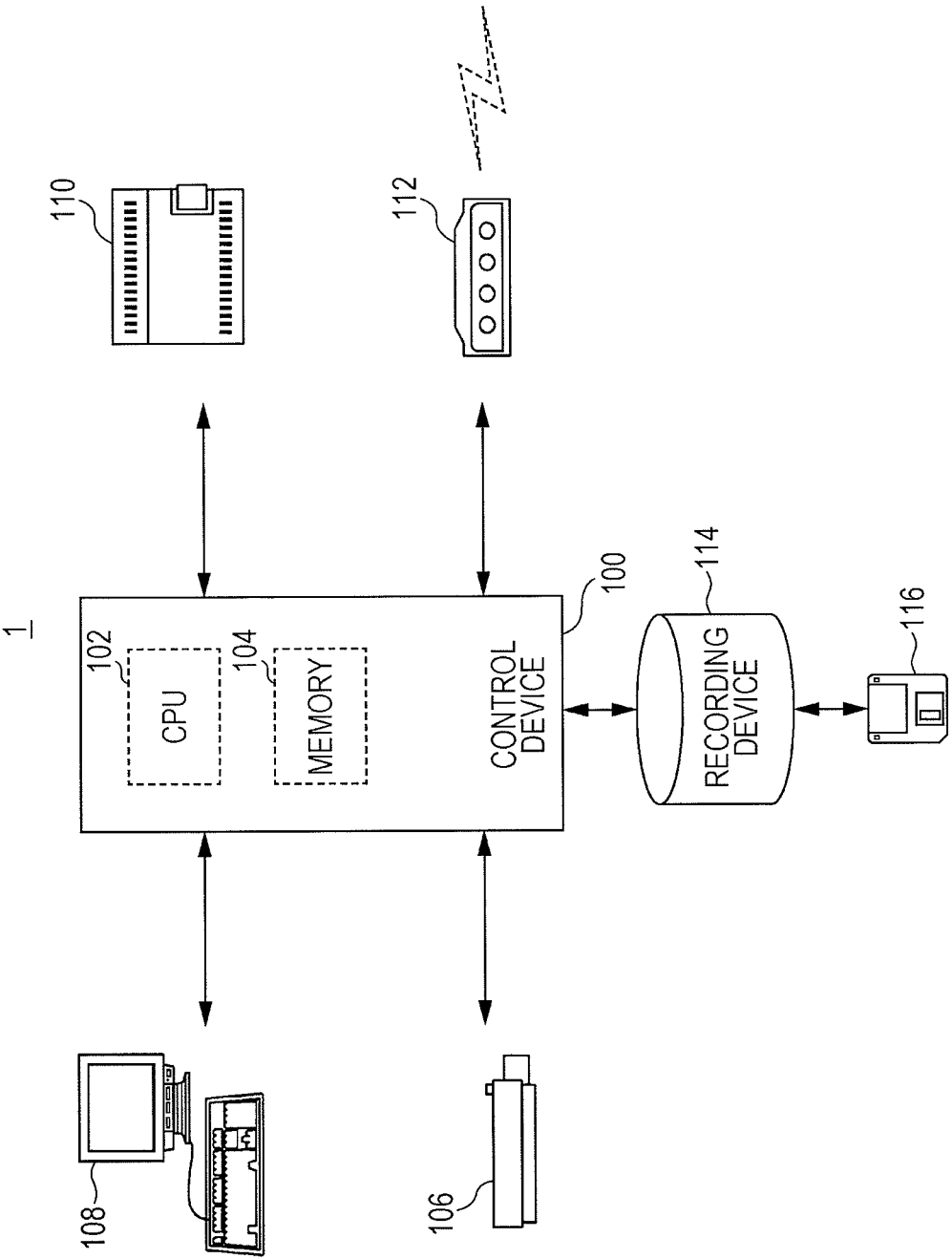

FIG. 7

| TABLE ID | STORAGE LOCATION INFORMATION | NUMBER OF COLUMNS | COLUMN WIDTH | MESHING PATTERN | ... | VERTICAL CONNECTION ID | HORIZONTAL CONNECTION ID |
|---|---|---|---|---|---|---|---|
| 1 | p1 | 4 | 8.5, 7.5, 6, 10 | 2, 0, 0, 0<br>2, 0, 0, 0<br>2, 0, 0, 0<br>2, 0, 0, 0 | ... | | 1 |
| 2 | p2 | 4 | 8.5, 7.5, 6, 10 | 2, 0, 0, 0 | ... | 1 | 2 |
| 3 | p3 | 4 | 8.5, 7.5, 6, 10 | 2, 0, 0, 0 | ... | 1 | 3 |
| 4 | p4 | 5 | 8.5, 7.5, 6, 5, 10 | 0, 0, 2, 0, 0 | ... | 1 | 4 |
| 5 | p5 | 5 | 8.5, 7.5, 6, 5, 10 | 0, 0, 2, 0, 0 | ... | 2 | 5 |
| ... | ... | ... | ... | ... | ... | 2 | ... |
| | | | | | | ... | |

FIG. 10C
FIG. 10B
FIG. 10A

| TABLE ID | STORAGE LOCATION INFORMATION | HEADER ROW INFORMATION | CONNECTION ID |
|---|---|---|---|
| 1 | p1 | No., AAA, BBB, CCC, DDD | 1 |
| 2 | p2 | No., AAA, BBB, CCC, DDD | 1 |
| 3 | p3 | No., AAA, BBB, CCC, DDD | 1 |
| 4 | p4 | ITEM, AB, CD, EF, GH | 2 |
| 5 | p5 | ITEM, AB, CD, EF, GH | 2 |
| ⋮ | ⋮ | ⋮ | ⋮ |

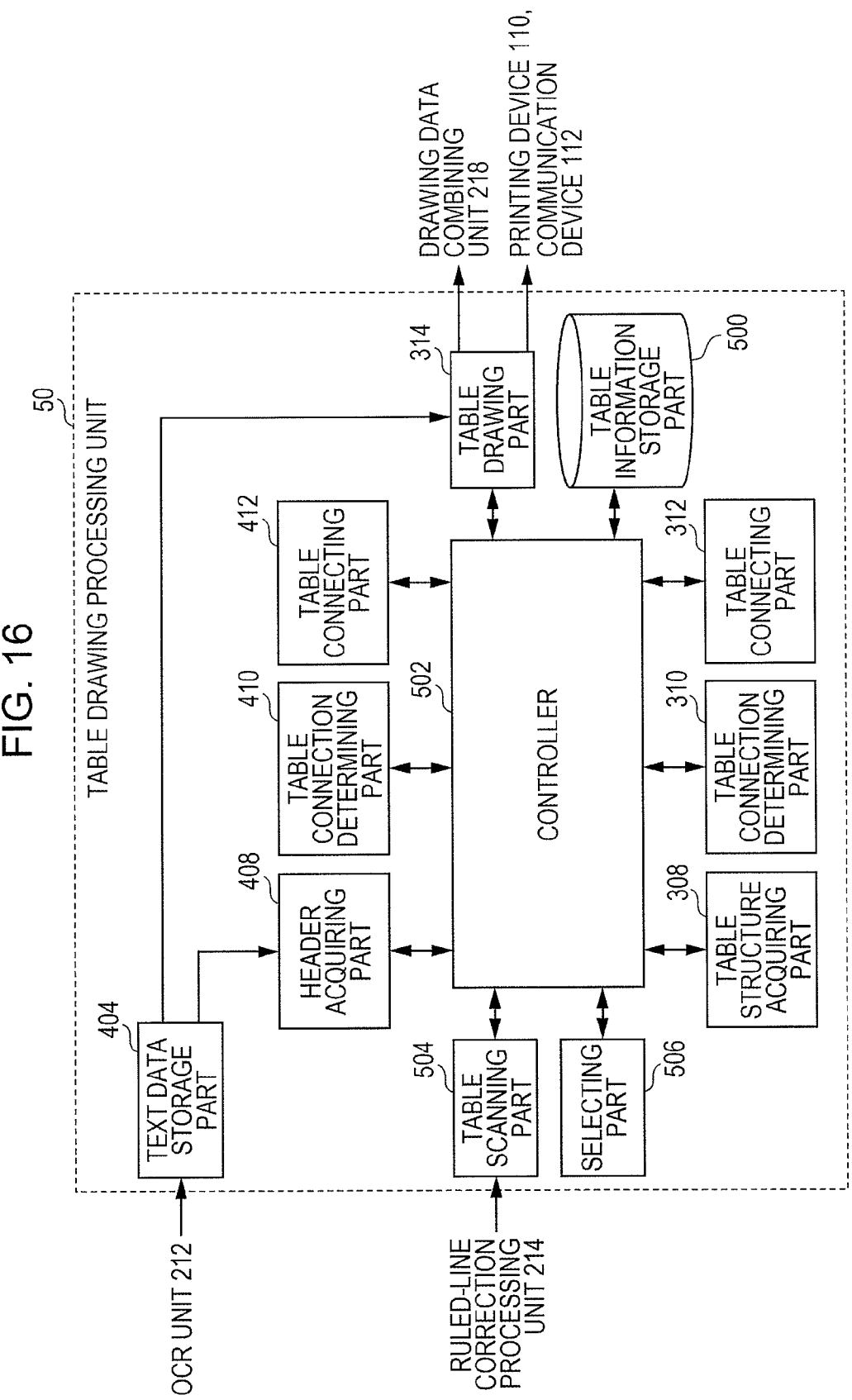

IMAGE PROCESSING APPARATUS, IMAGE PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2011-069573 filed Mar. 28, 2011.

BACKGROUND

Technical Field

The present invention relates to an image processing apparatus, an image processing method, and a computer readable medium storing a program.

SUMMARY

According to an aspect of the invention, there is provided an image processing apparatus including a header acquiring part, a table connection determining part, and a table connecting part. The header acquiring part acquires a header from a table that has rows and columns and that is included in each of plural pieces of image data arranged in a predetermined order. The header indicates items in the table that are set on a row and a column of the table or on one of a row and a column of the table. The table connection determining part determines whether the headers that have been acquired from the tables included in the plural pieces of image data match one another. The table connection determining part also determines, as a set of tables to be connected, tables that are adjacent to each other in the predetermined order and that have the matching headers. The table connecting part deletes the header from each of one or more second tables other than a first table and connects the first table and the one or more second tables, from each of which the header has been deleted, to each other in accordance with the predetermined order. The first table is included in a first piece of image data of pieces of image data of the determined set of tables in the predetermined order.

BRIEF DESCRIPTION OF THE DRAWINGS

Exemplary embodiment(s) of the present invention will be described in detail based on the following figures, wherein:

FIG. 1A is a diagram illustrating an electronic document including texts, a table, computer graphics (CG), and a photo;

FIG. 1B is a diagram illustrating output paper documents resulting from printing the electronic document illustrated in FIG. 1A;

FIG. 2A is a diagram illustrating a table portion in an electronic document, such as the one illustrated in FIG. 1A;

FIG. 2B is a diagram illustrating plural output paper documents resulting from printing the table portion illustrated in FIG. 1A;

FIG. 2C is a diagram illustrating an electronic document that is re-generated from the plural paper documents illustrated in FIG. 2B by an image processing apparatus according to the related art;

FIG. 3A is a diagram illustrating table portions in an electronic document;

FIG. 3B is a diagram illustrating plural output paper documents resulting from printing the table portions illustrated in FIG. 3A;

FIG. 3C is a diagram illustrating an electronic document that is re-generated from the plural paper documents illustrated in FIG. 3B by an image processing apparatus according to a first exemplary embodiment of the present invention;

FIG. 4 is a diagram illustrating a hardware configuration of an image processing apparatus according to an exemplary embodiment;

FIG. 7 is a diagram illustrating a first table-information table stored by a first table information storage part illustrated in FIG. 6;

FIG. 10A is a diagram illustrating a header-attached table portion in an electronic document;

FIG. 10B is a diagram illustrating plural output paper documents resulting from printing the table portion illustrated in FIG. 10A with the header being attached;

FIG. 10C is a diagram illustrating an electronic document that is re-generated from the plural paper documents illustrated in FIG. 10B by an image processing apparatus according to the related art;

FIG. 11A is a diagram illustrating plural output paper documents resulting from printing table portions in an electronic document with headers being attached;

FIG. 11B is a diagram illustrating tables from which header rows are deleted before re-generation of an electronic document;

FIG. 11C is a diagram illustrating an electronic document that is re-generated by an image processing apparatus according to a second exemplary embodiment of the present invention;

FIG. 13 is a diagram illustrating a second table-information table stored by a second table information storage part illustrated in FIG. 12;

FIG. 16 is a diagram illustrating a configuration of a third table drawing processing unit of a third electronic document generating program replacing the first table drawing processing unit of the first electronic document generating program illustrated in FIG. 5.

DETAILED DESCRIPTION

Figure 5:
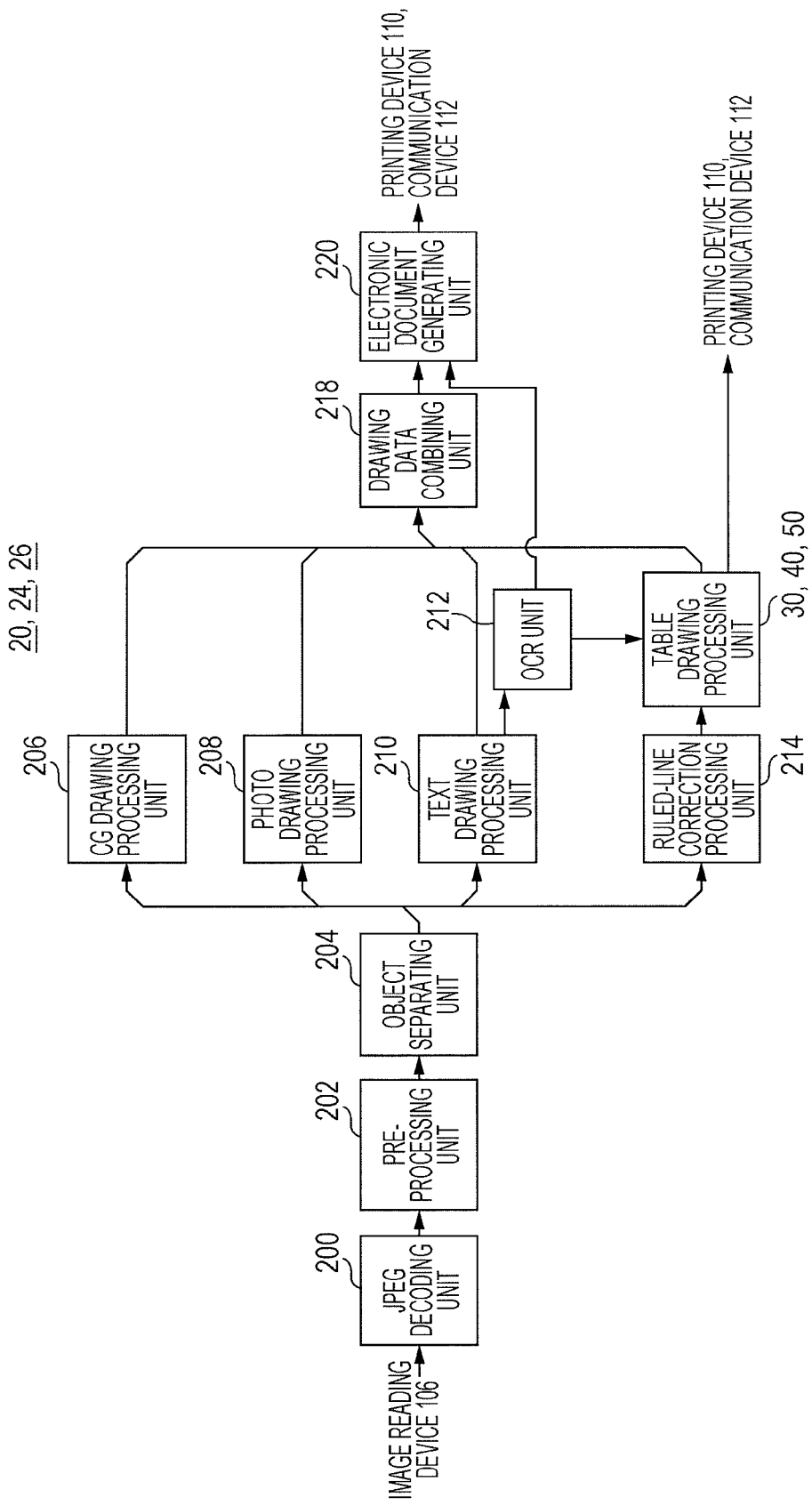
FIG. 5 is a diagram illustrating a configuration of a first electronic document generating program executed in the image processing apparatus illustrated in FIG. 4.

Prior to a description of exemplary embodiments, details about why the exemplary embodiments are made will be described below in order to help understanding of the exemplary embodiments.

FIG. 1A is a diagram illustrating an electronic document including texts, a table (having rows and columns, for example), computer graphics (CG), and a photo. FIG. 1B is a diagram illustrating output paper documents resulting from printing the electronic document illustrated in FIG. 1A.

For example, when an electronic document, such as the one illustrated in FIG. 1A, does not fit into one print sheet, a printing device divides the electronic document in accordance with size of the print sheet, prints the divided electronic sub-documents on plural paper documents, and outputs the plural paper documents as illustrated in FIG. 1B.

An image processing apparatus re-generates an electronic document from image data of paper documents read by an image reading device or the like connected to the image processing apparatus.

FIG. 2A is a diagram illustrating a table portion included in an electronic document, such as the one illustrated in FIG. 1A. FIG. 2B is a diagram illustrating plural output paper documents resulting from printing the table portion illustrated in FIG. 2A. FIG. 2C is a diagram illustrating an electronic document that is re-generated from the plural paper documents illustrated in FIG. 2B by the image processing apparatus.

When the aforementioned printing device and the aforementioned image processing apparatus are used, a table portion in an electronic document, such as the one illustrated in FIG. 2A, is divided and printed into plural paper documents as illustrated in FIG. 2B. The image processing apparatus re-generates an electronic document by treating the tables printed on the plural paper documents as independent tables as illustrated in FIG. 2C.

Since the re-generated electronic document (FIG. 2C) differs from the original electronic document (FIG. 2A), users have to reconfigure the re-generated electronic document in some way to make the re-generated electronic document the same as the original electronic document.

FIG. 3A is a diagram illustrating table portions included in an electronic document. FIG. 3B is a diagram illustrating plural output paper documents resulting from printing the table portions illustrated in FIG. 3A. FIG. 3C is a diagram illustrating an electronic document that is re-generated from the plural paper documents illustrated in FIG. 3B by an image processing apparatus 1 according to an exemplary embodiment of the present invention, which will be described below.

The image processing apparatus 1 according to the exemplary embodiment of the present invention to be described below is made in view of the aforementioned circumstances. When the table portions (FIG. 3A) included in the electronic document are divided and printed on the plural paper documents (FIG. 3B), the image processing apparatus 1 re-generates the electronic document (FIG. 3C) from these plural paper documents so that tables in the re-generated electronic document have the same structure as the tables in the original electronic document.

First Exemplary Embodiment

A first exemplary embodiment of the present invention will be described below.

FIG. 4 is a diagram illustrating a hardware configuration of the image processing apparatus 1.

As illustrated in FIG. 4, the image processing apparatus 1 includes a control device 100, an image reading device 106, an input/output device 108, a printing device 110, a communication device 112, and a recording device 114. The control device 100 includes a central processing unit (CPU) 102 and a memory 104. The image reading device 106 reads an image on a paper document to generate image data. The input/output device 108 includes a keyboard, a touch panel, and a display. The printing device 110 prints an electronic document and outputs a printed document. The communication device 112 performs data communication with other apparatuses. The recording device 114, such as a compact disc (CD) drive or a hard disk drive (HDD), records data on a storage medium 116 and reproduces data from the storage medium 116.

In each figure, substantially the same components and processing steps are represented by similar references below.

The image processing apparatus 1 receives image data of a paper document that results from printing an electronic document via the image reading device 106, the storage medium 116, and so forth. The image processing apparatus 1 processes the received image data to re-generate an electronic document (which will be described later with reference to FIGS. 5 and 6). The image processing apparatus 1 outputs the re-generated electronic document to the printing device 110 and the communication device 112.

FIG. 5 is a diagram illustrating a configuration of a first electronic document generating program 20 executed in the image processing apparatus 1 (FIG. 4).

As illustrated in FIG. 5, the electronic document generating program 20 includes a joint photographic experts group (JPEG) decoding unit 200, a pre-processing unit 202, an object separating unit 204, a CG drawing processing unit 206, a photo drawing processing unit 208, a text drawing processing unit 210, an optical character recognition (OCR) unit 212, a ruled-line correction processing unit 214, a first table drawing processing unit 30, a drawing data combining unit 218, and an electronic document generating unit 220.

The electronic document generating program 20 is loaded to the memory 104 of the image processing apparatus 1 via, for example, the storage medium 116 (FIG. 4) and is executed on an operating system (OS), not illustrated, that operates in the image processing apparatus 1 using hardware resources of the image processing apparatus 1.

The electronic document generating program 20 re-generates an electronic document having properties of elements (such as a text, a table, CG, and a photo) constituting image data of paper documents, resulting from printing an electronic document, that have been received via the image reading device 106 and the storage medium 116 (FIG. 4).

The JPEG decoding unit 200 decodes compressed image data that has been received via the image reading device 106, the storage medium 116 (FIG. 4), and so forth into uncompressed image data and outputs the resulting data to the pre-processing unit 202.

The pre-processing unit 202 performs pre-processing on the image data input from the JPEG decoding unit 200 before the object separating unit 204 performs processing. The pre-processing unit 202 then outputs the pre-processed image data to the object separating unit 204.

More specifically, the pre-processing unit 202 performs, on the input image data, noise reduction and filtering processing so that the image data is more easily separated into elements (objects), such as a text, a table, CG, and a photo.

Meanwhile, each element of the image data will be referred to as a "text object", a "table object", a "CG object", and a "photo object", and so forth below.

The object separating unit 204 separates each object from the image data input from the pre-processing unit 202. The object separating unit 204 outputs the CG object, the photo object, the text object, and the table object that have been separated to the CG drawing processing unit 206, the photo drawing processing unit 208, the text drawing processing unit 210, and the ruled-line correction processing unit 214, respectively.

The CG drawing processing unit 206 generates CG drawing data (e.g., vector drawing data) for generating an electronic document from the CG object input from the object separating unit 204 and outputs the generated drawing data to the drawing data combining unit 218.

The photo drawing processing unit 208 generates photo drawing data (e.g., image data) for generating an electronic document from the photo object input from the object separating unit 204 and outputs the generated drawing data to the drawing data combining unit 218.

The text drawing processing unit 210 generates text drawing data (e.g., text data and font data thereof) for generating an electronic document from the text object input from the object separating unit 204 and outputs the generated drawing data to the drawing data combining unit 218 and the OCR unit 212.

The OCR unit 212 performs OCR processing on the drawing data input from the text drawing processing unit 210 to identify a text and a position of the text in the image data.

The OCR unit 212 also outputs the identified text and position to the first table drawing processing unit 30 and the electronic document generating unit 220 as text data.

The ruled-line correction processing unit 214 performs correction processing on unclear or tilted ruled-lines of the table object input from the object separating unit 204 and outputs the correction result to the first table drawing processing unit 30.

The first table drawing processing unit 30 generates table drawing data (e.g., table-format data) for generating an electronic document on the basis of the text data input from the OCR unit 212 and the ruled-line-corrected table object input from the ruled-line correction processing unit 214 (which will be described in detail with reference to FIG. 6 and so forth).

The first table drawing processing unit 30 also outputs the generated table drawing data to at least one of the drawing data combining unit 218, the printing device 110, and the communication device 112 (FIG. 4).

The drawing data combining unit 218 combines the pieces of the drawing data input from the CG drawing processing unit 206, the photo drawing processing unit 208, the text drawing processing unit 210, and the first table drawing processing unit 30 with each other and outputs the resulting drawing data to the electronic document generating unit 220.

The electronic document generating unit 220 embeds the text data input from the OCR unit 212 at the same position of the combined drawing data input from the drawing data combining unit 218 as the position in the image data read by the image reading device 106 (FIG. 4) to generate an electronic document. The electronic document generating unit 220 then outputs the resulting electronic document to the printing device 110, the communication device 112 (FIG. 4), and so forth.

Figure 6:
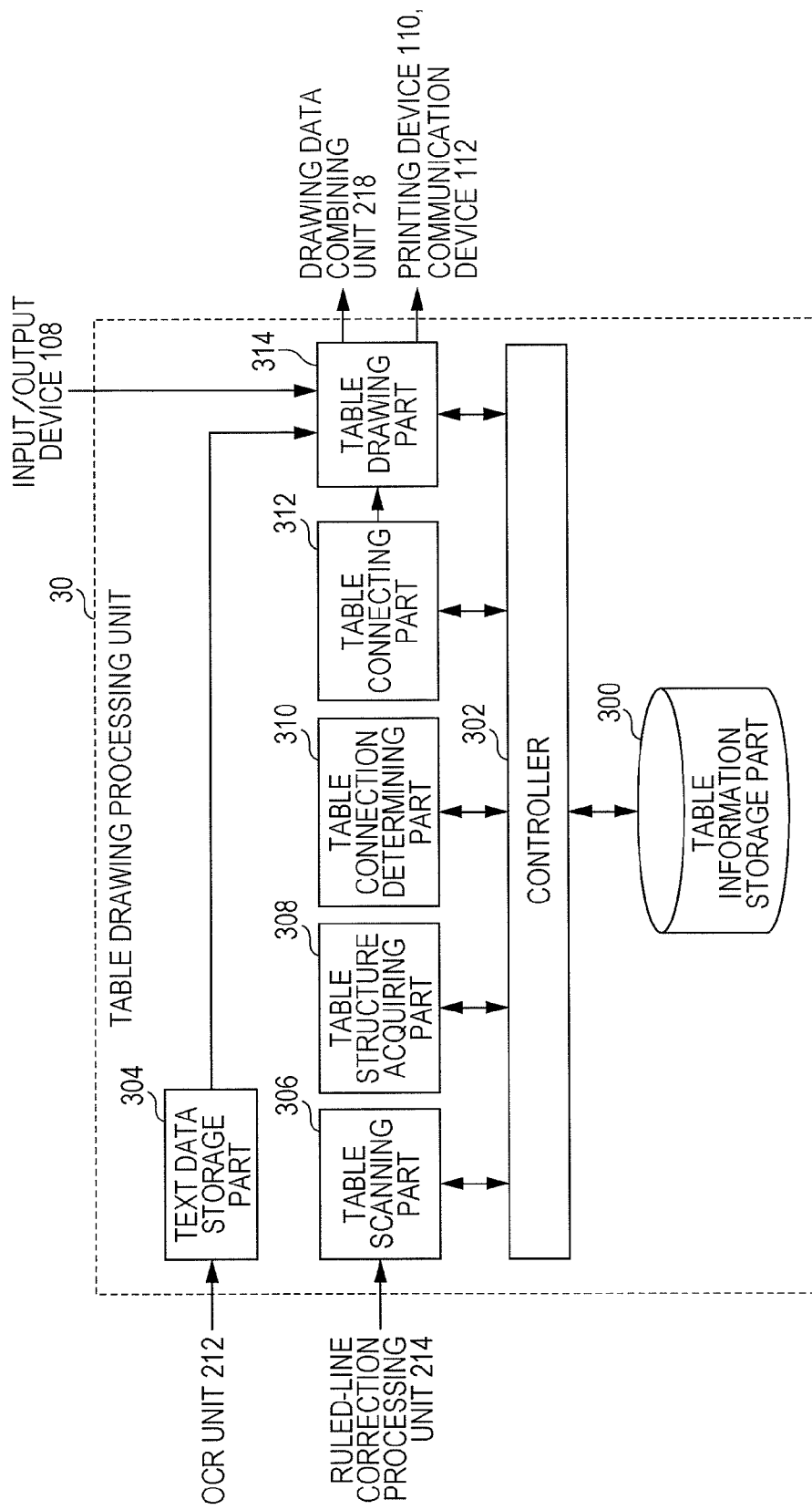
FIG. 6 is a diagram illustrating a configuration of a first table drawing processing unit of the first electronic document generating program illustrated in FIG. 5.

FIG. 6 is a diagram illustrating a configuration of the first table drawing processing unit 30 of the first electronic document generating program 20 illustrated in FIG. 5.

As illustrated in FIG. 6, the table drawing processing unit 30 includes a first table information storage part 300, a first controller 302, a first text data storage part 304, a first table scanning part 306, a table structure acquiring part 308, a first table connection determining part 310, a first table connecting part 312, and a table drawing part 314.

The table drawing processing unit 30 generates table drawing data from the image data of plural paper documents, into which a table portion in an original electronic document is divided and printed, so that a table of the generated table drawing data has the same structure as the table in the original electronic document.

FIG. 7 is a diagram illustrating a first table-information table stored by the table information storage part 300.

The table information storage part 300 stores the first table-information table, which is updated and referred to by each component illustrated in FIG. 6 via the controller 302.

The first table-information table displays a list of pieces of table information about divided table objects included in an original electronic document.

As illustrated in FIG. 7, examples of the table information include a table ID that uniquely identifies a table object, a storage location of a table object (e.g., an address of a data storage area in a memory), table structure information that indicates a structure of a table object, a vertical connection ID that identifies a set of table objects to be connected in a vertical direction, and a horizontal connection ID that identifies a set of table objects to be connected in a horizontal direction.

Examples of the table structure information include the number of columns and the number of rows of a table object, width of each columns (column width), height of each row (row height), a meshing pattern of each cell, color of each cell, and ruled-line information (such as color, type, and thickness) of each cell.

For example, as illustrated in FIG. 7, a table object having a table ID "1" is stored at an address "p1" and includes four columns having widths 8.5, 7.5, 6, and 10 (cm) sequentially from the left. On each row, the meshing patterns "2, 0, 0, 0" are set for cells sequentially from the left. The vertical connection ID is set to "1", whereas the horizontal connection ID is set to "1".

The controller 302 (FIG. 6) controls each component.

The text data storage part 304 receives text data input from the OCR unit 212 (FIG. 5) and stores the text data in a manner such that the table drawing part 314 can refer to the text data.

The table scanning part 306 scans table objects input from the ruled-line correction processing unit 214 (FIG. 5), acquires storage locations of the table objects, and assigns a table ID to each table object (a concrete case will be described below in which the table scanning part 306 assigns a smaller table ID to a table object included in each image data in accordance with the order in which the image data including the table object is read).

The table scanning part 306 adds the assigned table ID and the acquired storage location to the first table-information table stored in the table information storage part 300 via the controller 302.

The table structure acquiring part 308 accesses the storage location of each table object (FIG. 7) with reference to the first table-information table stored in the table information storage part 300 to acquire the table structure information of the table object under control of the controller 302.

The table structure acquiring part 308 also adds the acquired table structure information to the first table-information table stored in the table information storage part 300 via the controller 302.

The table connection determining part 310 sequentially refers to the first table-information table stored in the table information storage part 300 in ascending order of the table ID and determines a set of table objects to be connected on the basis of the table structure information (FIG. 7) for each table ID under control of the controller 302 (which will be described later with reference to FIGS. 8 and 9).

The table connection determining part 310 also adds the vertical connection ID and the horizontal connection ID of each table object to the first table-information table stored in the table information storage part 300 via the controller 302 on the basis of the determination result (which will be described with reference to FIGS. 8 and 9).

The table connecting part 312 connects table objects in the vertical or horizontal direction with reference to the first table-information table stored in the table information storage part 300 under control of the controller 302.

More specifically, for example, the table connecting part 312 first accesses storage locations (FIG. 7) of table objects having the same vertical connection ID in the first table-information table to acquire the table objects and connects the acquired table objects in ascending order of the table ID in the vertical direction (one table object is connected below the previous table object).

The table connecting part 312 then accesses storage locations of table objects having the same horizontal connection ID out of those that have not been connected in the vertical direction to acquire the table objects and connects the acquired table objects in ascending order of the table ID in the horizontal direction (one table object is connected to a right end of the previous table object).

The table connecting part 312 also outputs the connected table objects to the table drawing part 314.

Meanwhile, the priority is given to vertical connection in this exemplary embodiment but the configuration is not limited to this one and the priority may be given to horizontal connection.

Additionally, whether to give the priority to the vertical connection or to the horizontal connection may be appropriately changed on the basis of specification by a user, predetermined setting, and so forth.

Additionally, the table connection determining part 310 may be configured to determine table objects to be connected in one of the vertical direction and the horizontal direction.

The table drawing part 314 embeds the text data in the table objects input from the table connecting part 312 with reference to the text data stored by the text data storage part 304 to generate table drawing data.

The table drawing part 314 also outputs the generated table drawing data to at least one of the drawing data combining unit 218 (FIG. 5), the printing device 110, and the communication device 112 (FIG. 4).

For example, when the table drawing data is output to the printing device 110 and the communication device 112, the drawing data of the table objects alone is output from the image data including other objects (such as the text, the CG, and the photo) illustrated in FIGS. 1A and 1B.

Meanwhile, an output destination of the table drawing data is determined on the basis of specification from a user via the input/output device 108 (FIG. 4), predetermined setting, and so forth.

Figure 8:
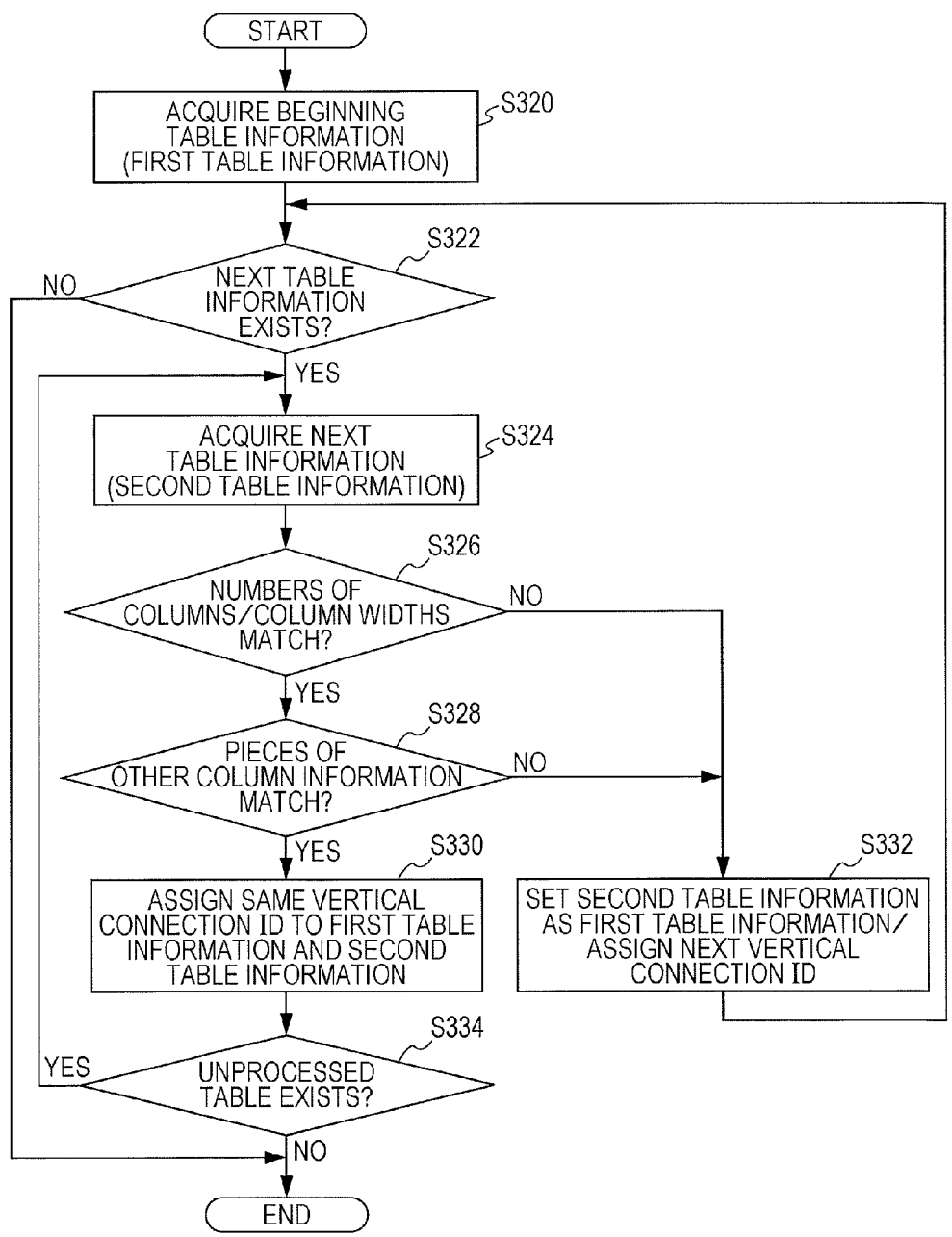
FIG. 8 is a flowchart illustrating a table connection determining process for determining whether to connect table objects in a vertical direction performed by a first table connection determining part illustrated in FIG. 6.

FIG. 8 is a flowchart illustrating a table connection determining process for determining whether to connect table objects in the vertical direction performed by the table connection determining part 310 (FIG. 6).

The table connection determining process for determining whether to connect table objects in the vertical direction performed by the table connection determining part 310 will be further described below.

In step S320, the table connection determining part 310 acquires beginning table information of the first table-information table (e.g., table information having the table ID "1" in the first table-information table illustrated in FIG. 7) as first table information.

In step S322, the table connection determining part 310 determines whether the first table-information table includes next table information (e.g., table information having the table ID "2" in the first table-information table illustrated in FIG. 7).

If the table connection determining part 310 determines that the next table information exists, the process proceeds to step S324. Otherwise, the process terminates.

In step S324, the table connection determining part 310 acquires the next table information as second table information.

In step S326, the table connection determining part 310 determines whether the number of columns and each column width of the first table information acquired in step S320 match the number of columns and the corresponding column width of the second table information acquired in step S324, respectively.

If the table connection determining part 310 determines that the numbers of columns match and that the corresponding column widths match, the process proceeds to step S328. Otherwise, the process proceeds to step S332.

In addition to the case where the column widths completely match, the table connection determining part 310 may determine that the column widths match when a difference between the corresponding column widths is within a predetermined range.

In step S328, the table connection determining part 310 determines whether table structure information (hereinafter, referred to as "other column information") other than the number of columns and the column width of the first table information acquired in step S320 matches other column information of the second table information acquired in step S324.

More specifically, for example, the table connection determining part 310 determines whether a color difference between average colors of cells on corresponding columns in the first table information and the second table information is within a predetermined range.

Additionally, for example, the table connection determining part 310 determines whether the meshing patterns of cells on corresponding columns in the first table information and the second table information match.

For example, since dot pattern meshing is placed on cells on a first column and is not placed on cells on other columns on pages 1 to 3 of the paper document illustrated in FIG. 3B, the table connection determining part 310 determines that the meshing patterns match.

Additionally, the table connection determining part 310 may determine that the meshing patterns match when a positional relationship between a central dot of the meshing dots in a main scanning direction and a central dot thereof in a sub scanning direction and a difference between average densities of the central dots are within predetermined ranges.

In addition, for example, the table connection determining part 310 determines whether a color difference, a thickness difference, and so forth of vertical ruled-lines on corresponding columns in the first table information and the second table information are within a predetermined range and determines whether ruled-lines are of the same type.

If the table connection determining part 310 determines that the pieces of the other column information match, the process proceeds to step S330. Otherwise, the process proceeds to step S332.

In step S330, the table connection determining part 310 assigns the same vertical connection ID to the first table information and the second table information.

In step S332, the table connection determining part 310 sets the second table information acquired in step S324 as new first table information and assigns a new vertical connection ID (e.g., a value obtained by adding "1" to the present vertical connection ID). The process then returns to step S322.

In step S334, the table connection determining part 310 determines whether the first table-information table includes table information on which the table connection determining process has not been performed yet.

If the table connection determining part 310 determines that unprocessed table information exists, the process returns to step S324. Otherwise, the process terminates.

Meanwhile, in the flowchart illustrated in FIG. 8, if it is determined that the numbers of columns match and the column widths match in step S326 and that the pieces of other column information match in step S328, the table connection determining part 310 determines to connect the first table information and the second table information to each other. However, the determination in the S328 may be skipped.

In this case, if the table connection determining part 310 determines that the numbers of columns match and the column widths match in step S326, the process proceeds to step S330. Otherwise, the process proceeds to step S332.

Figure 9:
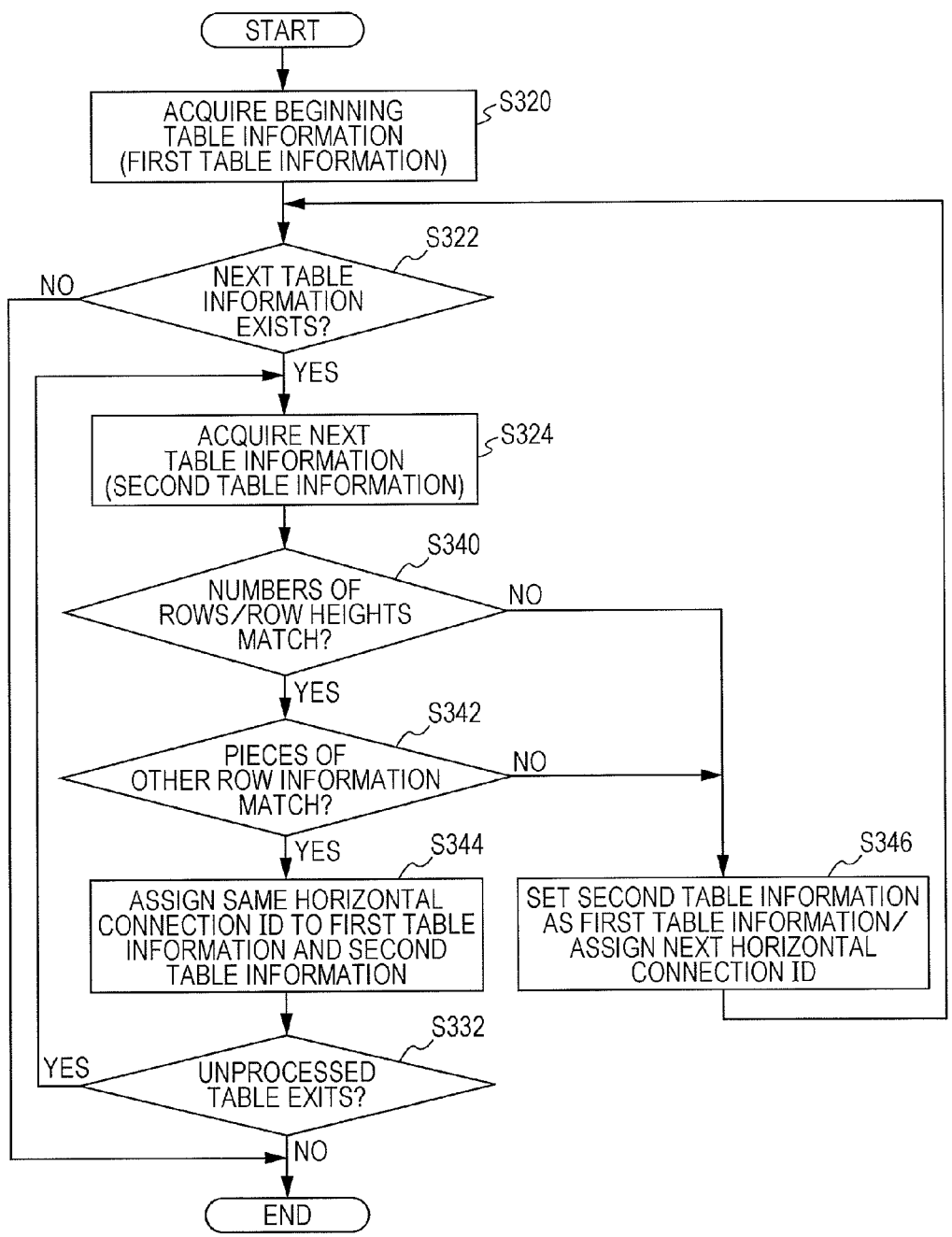
FIG. 9 is a flowchart illustrating a table connection determining process for determining whether to connect table objects in a horizontal direction performed by the first table connection determining part illustrated in FIG. 6.

FIG. 9 is a flowchart illustrating a table connection determining process for determining whether to connect table objects in the horizontal direction performed by the table connection determining part 310 (FIG. 6).

The table connection determining process for determining whether to connect table objects in the horizontal direction performed by the table connection determining part 310 will be further described below.

In steps S320 to S324, the table connection determining part 310 performs processing similar to that performed in steps S320 to S324 illustrated in FIG. 8.

In step S340, the table connection determining part 310 determines whether the number of rows and each row height of the first table information acquired in step S320 match the number of rows and the corresponding row height of the second table information acquired in step S324, respectively.

If the table connection determining part 310 determines that the numbers of rows match and the corresponding row heights match, the process proceeds to step S342. Otherwise, the process proceeds to step S346.

In addition to the case where the corresponding row heights completely match, the table connection determining part 310 may also determine that the row heights match when a difference between the corresponding row heights is within a predetermined range.

In step S342, the table connection determining part 310 determines whether table structure information (hereinafter, referred to as "other row information") other than the number of rows and the row height of the first table information acquired in step S320 matches other row information of the second table information acquired in step S324.

More specifically, for example, as in step S328 (FIG. 8), the table connection determining part 310 determines whether a color difference between average colors of cells on corresponding rows of the first table information and the second table information is within a predetermined range.

Additionally, for example, as in step S328 (FIG. 8), the table connection determining part 310 determines whether meshing patterns on all columns on corresponding rows of the first table information and the second table information match.

For example, since dot pattern meshing is placed on cells on a first column but the meshing is not placed on cells on other columns on each row of each page of the paper document illustrated in FIG. 3B, the table connection determining part 310 determines that the meshing patterns do not match.

Additionally, for example, as in step S328 (FIG. 8), the table connection determining part 310 determines whether a color difference or a thickness difference between horizontal ruled-lines on corresponding rows of the first table information and the second table information is within a predetermined range or whether the ruled-lines are of the same type.

If the table connection determining part 310 determines that pieces of the other row information match, the process proceeds to step S344. Otherwise, the process proceeds to step S346.

In step S344, the table connection determining part 310 assigns the same horizontal ID to the first table information and the second table information.

In step S346, the table connection determining part 310 sets the second table information acquired in step S324 as new first table information and assigns a new horizontal connection ID (e.g., a value obtained by adding "1" to the present horizontal ID). The process then returns to step S322.

In step S332, the table connection determining part 310 performs processing similar to that performed in step S332 illustrated in FIG. 8.

Meanwhile, in the flowchart illustrated in FIG. 9, if it is determined that the numbers of rows match and the row heights match in step S340 and that the pieces of other row information match in step S342, the table connection determining part 310 determines to connect the first table information and the second table information to each other. However, the determination in the S342 may be skipped.

In this case, as in the case of the vertical table connection, if the table connection determining part 310 determines that the numbers of rows match and the row heights match in step S340, the process proceeds to step S344. Otherwise, the process proceeds to step S346.

A first operation example of the image processing apparatus 1 (FIG. 4) will be described below.

In this operation example, a description will be given for a process performed by the image processing apparatus 1 to re-generate an electronic document illustrated in FIG. 3C from plural paper documents (FIG. 3B) on which table portions in an original electronic document (FIG. 3A) are printed.

The image processing apparatus 1 (the table scanning part 306 (FIG. 6)) scans table objects separated from image data of the plural paper documents read via the image reading device 106 and adds tables IDs and storage locations to the first table-information table.

More specifically, in this operation example, the image processing apparatus 1 adds five table IDs and five storage locations as illustrated in FIG. 7.

The image processing apparatus 1 (the table structure acquiring part 308 (FIG. 6)) acquires the structure information of each of the table objects corresponding to the five table IDs and adds the acquired structure information to the first table-information table (FIG. 7).

The image processing apparatus 1 (the table connection determining part 310 (FIGS. 6, 8, and 9)) determines a set of table objects to be vertically or horizontally connected on the basis of the first table-information table and adds vertical connection IDs and horizontal connection IDs to the first table-information table.

More specifically, in this operation example, the image processing apparatus 1 sets the vertical connection ID of the table objects having the table IDs "1" to "3", whose the numbers of columns, column widths, and meshing patterns on corresponding columns match, to "1". The image processing apparatus 1 also sets the vertical connection ID of the table objects having the table IDs "4" and "5" to "2" (FIG. 7).

Additionally, in this operation example, since the meshing patterns of cells on corresponding rows of the table objects differ from one another, the image processing apparatus 1 sets different horizontal connection IDs (FIG. 7).

The image processing apparatus 1 (the table connecting part 312 (FIG. 6)) connects the table objects on the basis of the vertical connection ID and the horizontal connection ID of the first table-information table.

More specifically, in this operation example, the image processing apparatus 1 connects the table objects having the table IDs "1" to "3" and the vertical connection ID "1" in the vertical direction. The image processing apparatus 1 also connects the table objects having the table IDs "4" and "5" and the vertical connection ID "2" in the vertical direction (FIG. 3C).

The image processing apparatus 1 (the table drawing part 314 (FIG. 6)) embeds text data in the connected table objects to generate table drawing data and outputs the generated table drawing data to at least one of the drawing data combining unit 218 (FIG. 5), the printing device 110, and the communication device 112 (FIG. 4).

Second Exemplary Embodiment

A second exemplary embodiment of the present invention will be described below.

FIG. 10A is a diagram illustrating a table portion having a header indicating a meaning of each item of rows or columns in an electronic document. FIG. 10B is a diagram illustrating plural output paper documents resulting from printing the table portion illustrated in FIG. 10A with the header being attached. FIG. 10C is a diagram illustrating an electronic document that is re-generated from the plural paper documents illustrated in FIG. 10B by an image processing apparatus according to the related art.

When the header-attached table portion included in the electronic document illustrated in FIG. 10A is divided and is printed into plural paper documents with the header being attached as illustrated in FIG. 10B, the image processing apparatus re-generates an electronic document by treating the tables printed on the plural paper documents as independent tables each attached with the header as illustrated in FIG. 10C.

Figures 11A, 11B, 11C:
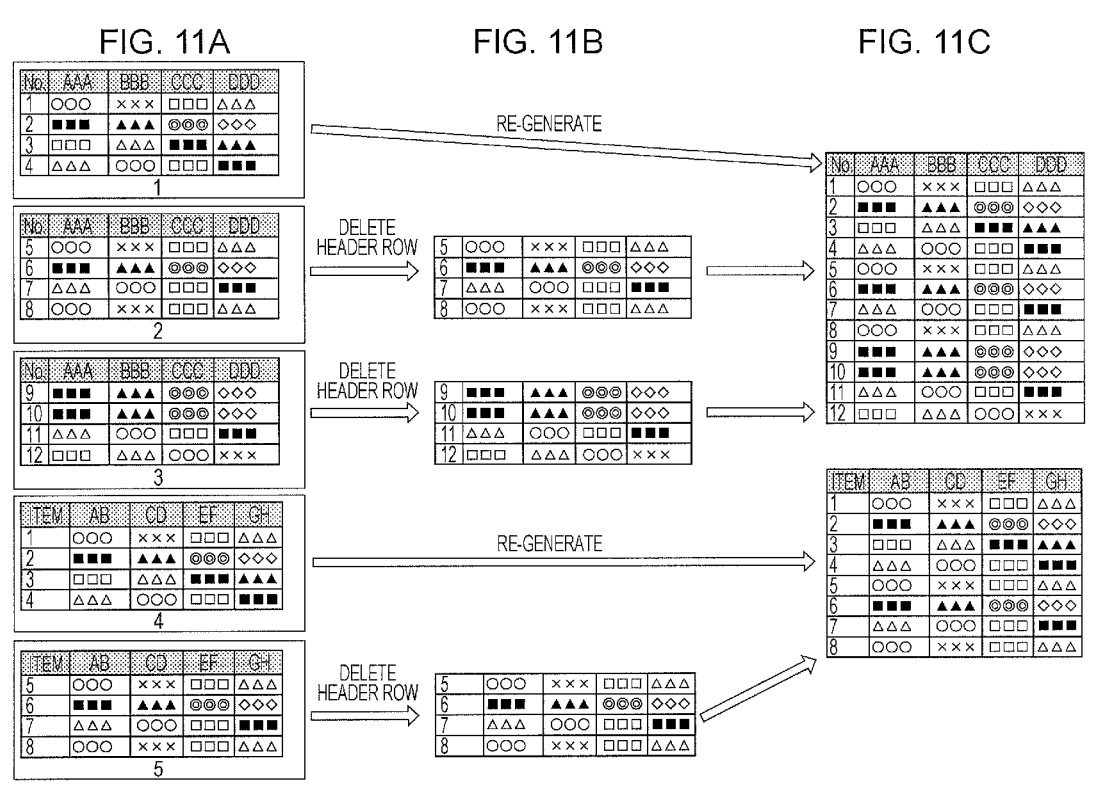

FIG. 11A is a diagram illustrating plural output paper documents resulting from printing table portions included in an original electronic document with headers being attached. FIG. 11B is a diagram illustrating tables from which header rows are deleted before re-generation of an electronic document. FIG. 11C is a diagram illustrating an electronic document that is re-generated by an image processing apparatus 1 according to the second exemplary embodiment of the present invention to be described below.

The image processing apparatus 1 according to the second exemplary embodiment of the present invention to be described below is made in view of the aforementioned circumstances. In the second exemplary embodiment of the present invention, a concrete case will be described in which the electronic document is re-generated in a manner as illustrated in FIG. 11C so that re-generated tables have the same structure as the header-attached tables (FIG. 11A) included in the original electronic document.

Figure 12:
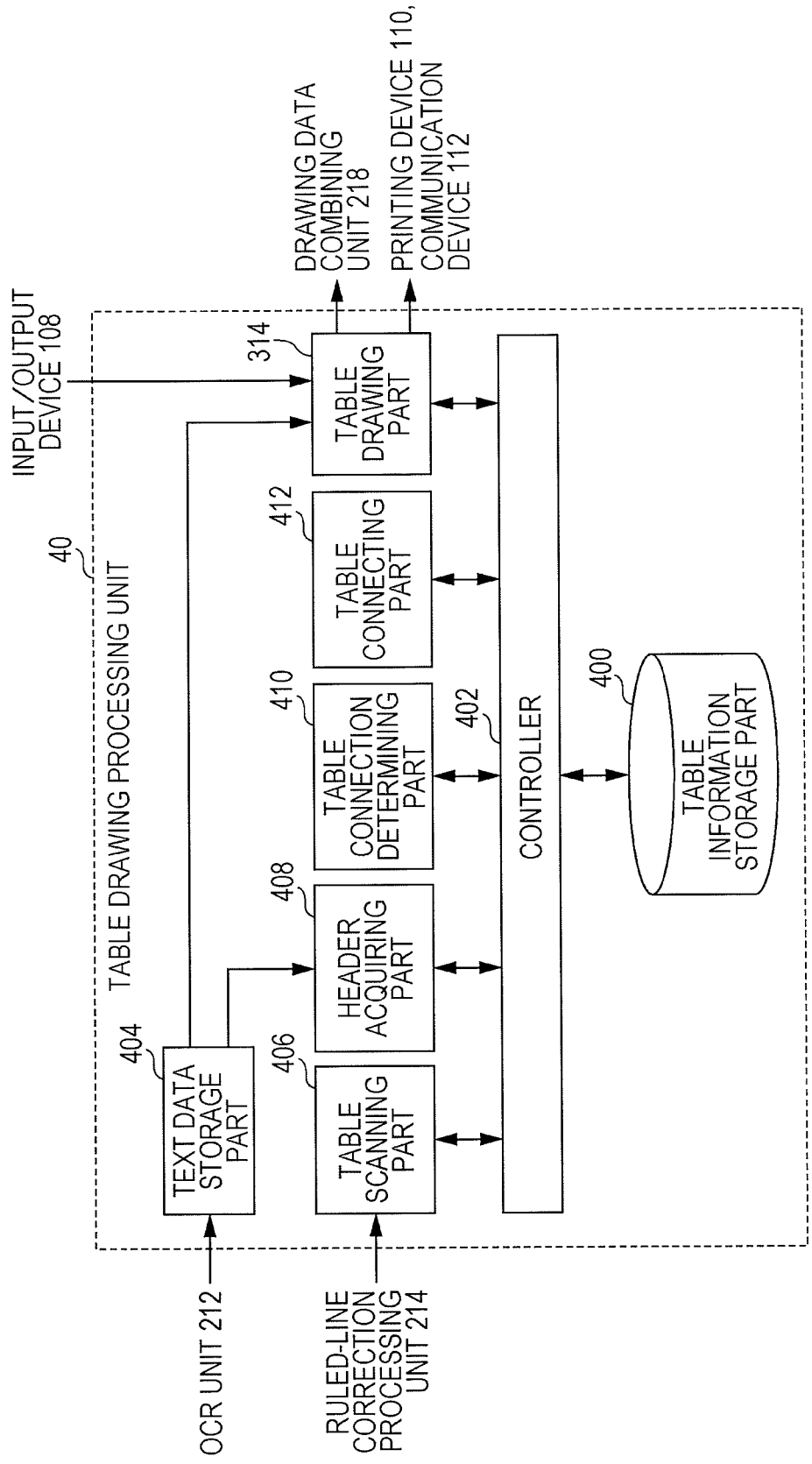
FIG. 12 is a diagram illustrating a configuration of a second table drawing processing unit of a second electronic document generating program replacing the first table drawing processing unit of the first electronic document generating program illustrated in FIG. 5.

FIG. 12 is a diagram illustrating a configuration of a second table drawing processing unit 40 of a second electronic document generating program 24 that replaces the first table drawing processing unit 30 of the first electronic document generating program 20 illustrated in FIG. 5 in accordance with the first exemplary embodiment of the present invention.

As illustrated in FIG. 12, the second table drawing processing unit 40 includes a second table information storage part 400, a second controller 402, a second text data storage part 404, a second table scanning part 406, a header acquiring part 408, a second table connection determining part 410, a second table connecting part 412, and a table drawing part 314.

The table drawing processing unit 40 generates table drawing data from image data of plural paper documents, on which table portions each attached with a header are divided and printed, so that re-generated tables attached with headers have the same structure as the tables in an original electronic document.

Meanwhile, in this exemplary embodiment, a description will be given below for a concrete case where a first row of a table displays a header and divided sub-tables are connected in a vertical direction.

FIG. 13 is a diagram illustrating a second table-information table stored by the table information storage part 400.

The table information storage part 400 stores the second table-information table that is updated and referred to by each component illustrated in FIG. 12 via the controller 402.

As illustrated in FIG. 13, examples of table information of the second table-information table include a table ID and a storage location of a table object that are similar to those in the first table-information table illustrated in FIG. 7, header row information that indicates content of each cell on a header row, and a connection ID that identifies a set of table objects to be connected.

For example, as illustrated in FIG. 13, a table object having a table ID "1" is stored at an address "p1" and has a connection ID "1". Contents of cells on the header row thereof include "No.". "AAA", "BBB", "CCC", and "DDD" sequentially from the left.

The controller 402 (FIG. 12) controls each component.

Like the text data storage part 304 illustrated in FIG. 6, the text data storage part 404 receives text data input from an OCR unit 212 (FIG. 5) and stores the text data in a manner such that the header acquiring part 408 and the table drawing part 314 can refer to the text data.

Like the table scanning part 306 illustrated in FIG. 6, the table scanning part 406 scans table objects input from a ruled-line correction processing unit 214 (FIG. 5), acquires storage locations of the table objects, and assigns table IDs to the respective table objects.

The table scanning part 406 also adds the assigned table IDs and the acquired storage locations to the second table-information table stored in the table information storage part 400 via the controller 402.

The header acquiring part 408 accesses a storage location (FIG. 13) of a table object with reference to the second table-information table stored in the table information storage part 400 to acquire the table object under control of the controller 402.

The header acquiring part 408 also acquires a text located at a position corresponding to each cell on the first row of the acquired table object with reference to the text data stored by the text data storage part 404.

Additionally, the header acquiring part 408 adds the acquired text to the second table-information table stored in the table information storage part 400 via the controller 402.

The table connection determining part 410 refers to the second table-information table stored in the table information storage part 400 in ascending order of the table ID and determines a set of table objects to be connected on the basis of the header row information of the table object corresponding to each table ID under control of the controller 402 (which will be described later with reference to FIG. 14).

The table connection determining part 410 also adds the connection ID of each table object to the second table-information table stored in the table information storage part 400 via the controller 402 on the basis of the determined result (which will be described later with reference to FIG. 14).

The table connecting part 412 connects table objects with reference to the connection ID (FIG. 13) of the second table-information table stored in the table information storage part 400 and outputs the connected table objects to the table drawing part 314 under control of the controller 402 (which will be described later with reference to FIG. 15).

Figure 14:
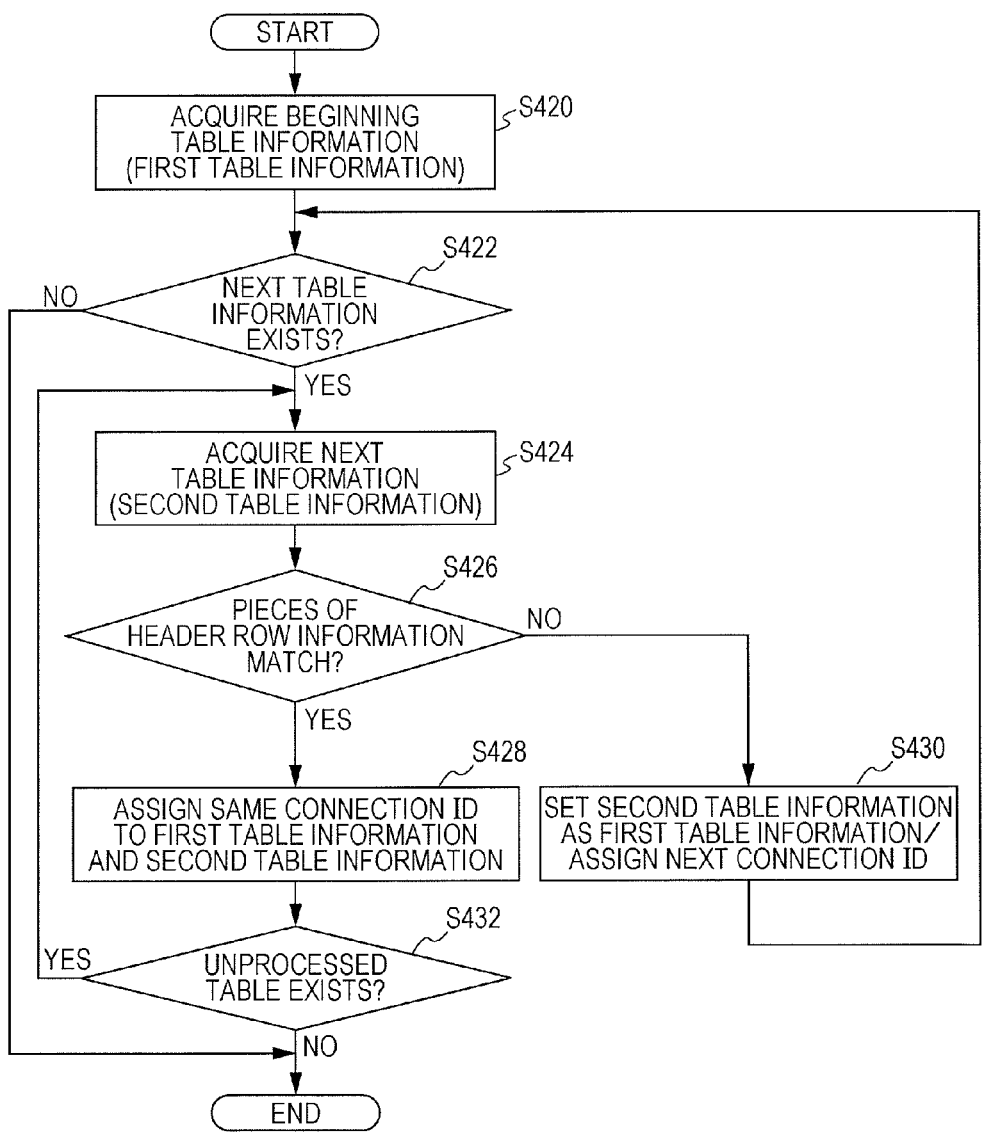
FIG. 14 is a flowchart illustrating a table connection determining process for determining whether to connect table objects performed by a second table connection determining part illustrated in FIG. 12.

FIG. 14 is a flowchart illustrating a table connection determining process for determining whether to connect table objects performed by the table connection determining part 410 (FIG. 12).

The table connection determining process for determining whether to connect table objects performed by the table connection determining part 410 will be further described below.

In step S420, the table connection determining part 410 acquires beginning table information of the second table-information table (e.g., table information having the table ID "1" in the second table-information table in FIG. 13) as first table information.

In step S422, the table connection determining part 410 determines whether the second table-information table includes next table information (e.g., table information having the table ID "2" in the second table-information table illustrated in FIG. 13).

If the table connection determining part 410 determines that the next table information exists, the process proceeds to step S424. Otherwise, the process terminates.

In step S424, the table connection determining part 410 acquires the next table information as second table information.

In step S426, the table connection determining part 410 determines whether header row information of the first table information acquired in step S420 matches header row information of the second table information acquired in step S424.

If the table connection determining part 410 determines that the pieces of the header row information match, the process proceeds to step S428. Otherwise, the process proceeds to step S430.

The table connection determining part 410 may determine that the pieces of the header row information match when at least one header of one column of the header row information of the first table information matches a corresponding header of a corresponding column of the header row information of the second table information.

Additionally, the table connection determining part 410 may determine that the pieces of the header row information match when at least one header of one column of the first table information matches a corresponding header of a corresponding column of the second table information, and the number of columns or the number of columns and each column width of the first table information further match the number of columns or the number of columns and corresponding column width of the second table information, respectively.

In step S428, the table connection determining part 410 assigns the same connection ID to the first table information and the second table information.

In step S430, the table connection determining part 410 sets the second table information acquired in step S424 as new first table information and assigns a new connection ID (e.g., a value obtained by adding "1" to the present connection ID). The process then returns to step S422.

In step S432, the table connection determining part 410 determines whether the second table-information table includes table information on which the table connection determining process has not been performed yet.

If the table connection determining part 410 determines that unprocessed table information exists, the process returns to step S424. Otherwise, the process terminates.

Figure 15:
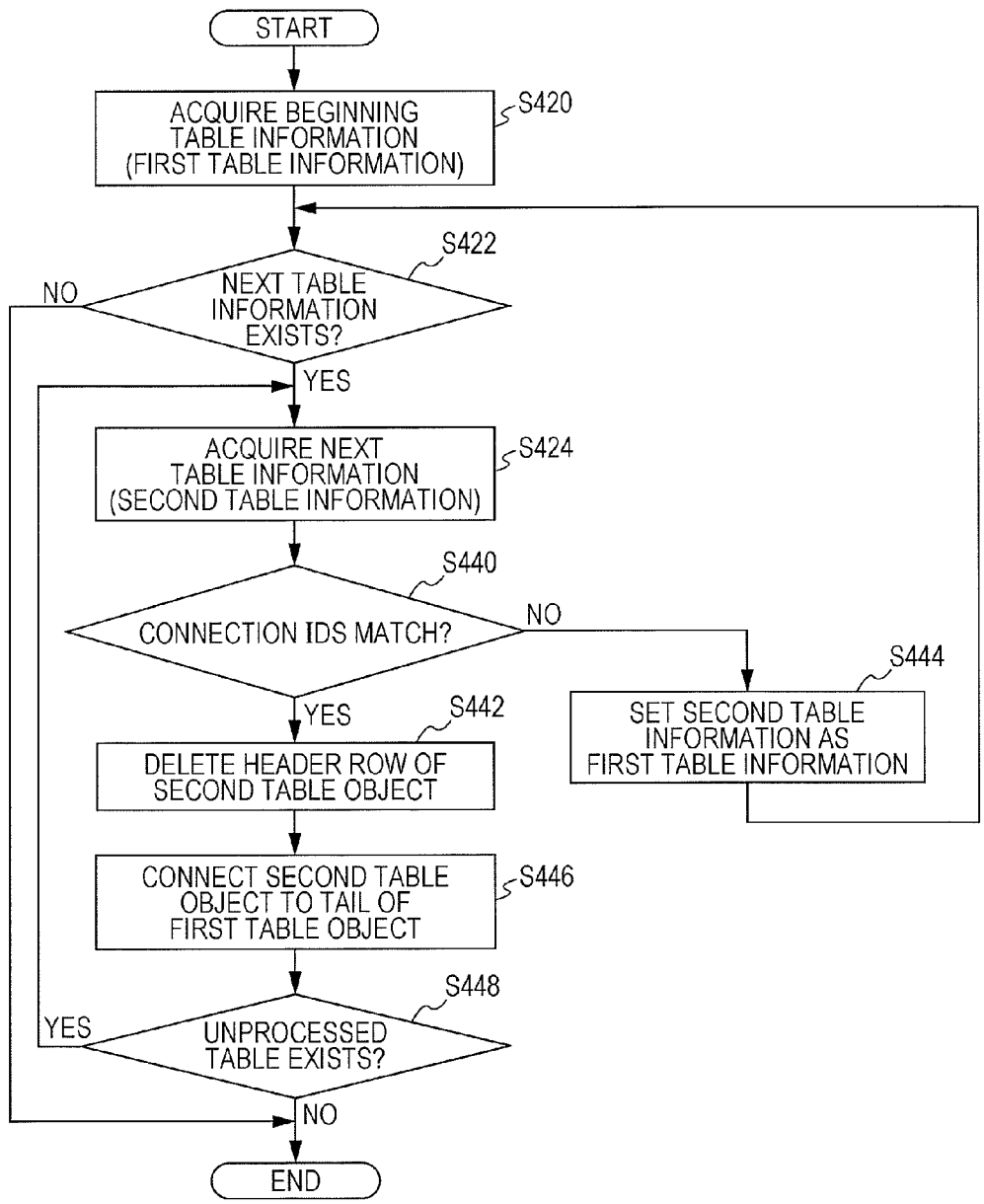
FIG. 15 is a flowchart illustrating a table connecting process for connecting table objects performed by a second table connecting part illustrated in FIG. 12.

FIG. 15 is a flowchart illustrating a table connecting process for connecting table objects performed by the table connecting part 412 (FIG. 12).

The table connecting process for connecting table objects performed by the table connecting part 412 will be further described below.

In steps S420 to S424, the table connecting part 412 performs processing similar to that in steps S420 to S424 illustrated in FIG. 14.

In step S440, the table connecting part 412 determines whether the connection ID of the first table information acquired in step S420 matches the connection ID of the second table information acquired in step S424.

If the table connecting part 412 determines that the connection IDs match, the process proceeds to step S442. Otherwise, the process proceeds to step S444.

In step S442, the table connecting part 412 accesses the storage location of the second table information acquired in step S424 to acquire a table object (a second table object) and deletes a first row, corresponding to a header row, of the acquired second table object.

In step S444, the table connecting part 412 sets the second table information as new first table information. The process then returns to step S422.

In step S446, the table connecting part 412 accesses the storage location of the first table information acquired in step S420 to acquire a table object (a first table object) and vertically connects the header-deleted second table object below the acquired first table object.

In step S448, the table connecting part 412 determines whether the second table-information table includes a table object on which the table connecting process has not been performed yet.

If the table connecting part 412 determines that an unprocessed table object exists, the process returns to step S424. Otherwise, the process terminates.

A second operation example of the image processing apparatus 1 (FIG. 4) will be described below.

In this operation example, a description will be given for a process performed by the image processing apparatus 1 to re-generate an electronic document illustrated in FIG. 11C from plural paper documents (FIG. 11A) on which header-attached table portions in an original electronic document are printed.

The image processing apparatus 1 (the table scanning part 406 (FIG. 12)) scans table objects separated from image data of the plural paper documents read via an image reading device 106 and adds table IDs and storage locations to the second table-information table.

More specifically, in this operation example, the image processing apparatus 1 adds five table IDs and five storage locations as illustrated in FIG. 13.

The image processing apparatus 1 (the header acquiring part 408 (FIG. 12)) acquires header row information of each of the table objects corresponding to the five table IDs and adds the acquired header row information to the second table-information table (FIG. 13).

The image processing apparatus 1 (the table connection determining part 410 (FIGS. 12 and 14)) determines a set of table objects to be connected on the basis of the second table-information table and adds the connection IDs to the second table-information table.

More specifically, in this operation example, the image processing apparatus 1 sets the connection ID of the table objects having the table IDs "1" to "3" and having the matching header row information to "1". The image processing apparatus 1 also sets the connection ID of the table objects having the table IDs "4" and "5" to "2" (FIG. 13).

The image processing apparatus 1 (the table connecting part 412 (FIGS. 12 and 15)) connects the table objects on the basis of the connection ID of the second table-information table.

More specifically, in this operation example, the image processing apparatus 1 deletes the header row from the table objects having the table IDs "2" and "3" out of the table objects having the table IDs "1" to "3" and the connection ID "1" (FIG. 11B). The image processing apparatus 1 then sequentially connects the table objects having the table IDs "2" and "3" below the table object having the table ID "1" in the vertical direction (FIG. 11C).

The image processing apparatus 1 also deletes the header row from the table object having the table ID "5" out of the table objects having the table IDs "4" and "5" and the connection ID "2" (FIG. 11B). The image processing apparatus 1 then connects the table object having the table ID "5" below the table object having the table ID "4" in the vertical direction (FIG. 11C).

The image processing apparatus 1 (the table drawing part 314 (FIG. 12)) embeds text data in the connected table objects to generate table drawing data and outputs the generated table drawing data to at least one of a drawing data combining unit 218 (FIG. 5), a printing device 110, and a communication device 112 (FIG. 4).

Modification of Second Exemplary Embodiment

In the description of the second exemplary embodiment, the concrete case in which a first row of a table displays a header and divided sub-tables are connected in the vertical direction is used. However, the second exemplary embodiment is not limited to this concrete case and may be configured so that a first column of a table displays a header and divided sub-tables are connected in the horizontal direction.

In this case, the header acquiring part 408 acquires a text at a position corresponding to each cell on the first column of each table object with reference to text data stored by the text data storage part 404.

The header acquiring part 408 also adds, as header column information, the acquired text to the second table-information table stored in the table information storage part 400 via the controller 402.

As in the table connection determining process illustrated in FIG. 14, the table connection determining part 410 also determines a set of table objects to be connected on the basis of the header column information and adds the connection IDs to the second table-information table stored in the table information storage part 400 via the controller 402.

As in the table connecting process illustrated in FIG. 15, the table connecting part 412 connects the table objects in the horizontal direction on the basis of the connection ID.

Additionally, the second exemplary embodiment and the modification of the second exemplary embodiment may be combined with each other so that the image processing apparatus 1 performs the vertical table connection process when the extracted header is located on a first row of a table, and performs the horizontal table connection process when the extracted header is located on a first column of a table.

In addition, a last row or a last column of a table may display a header.

Third Exemplary Embodiment

A third exemplary embodiment of the present invention will be described below.

In the third exemplary embedment of the present invention, a concrete case will be described in which one of the first and second exemplary embodiments is selected in accordance with presence or absence of a header in a table portion included in an original electronic document and table drawing data is generated from image data of plural paper documents so that a re-generated table has the same structure as the table in the original electronic document.

FIG. 16 is a diagram illustrating a configuration of a third table drawing processing unit 50 of a third electronic document generating program 26 that replaces the first table drawing processing unit 30 of the first electronic document generating program 20 illustrated in FIG. 5 in accordance with the first exemplary embodiment of the present invention.

As illustrated in FIG. 16, the third table drawing processing unit 50 includes a third table information storage part 500, a third controller 502, a third table scanning part 504, a selecting part 506, a table structure acquiring part 308, a first table connection determining part 310, a first table connecting part 312, a table drawing part 314, a second text data storage part 404, a header acquiring part 408, a second table connection determining part 410, and a second table connecting part 412.

The table drawing processing unit 50 selects one of the first and second exemplary embodiments in accordance with presence or absence of a header in a table portion included in an electronic document and generates table drawing data.

The table information storage part 500 stores a third table-information table that is updated and referred to by each component illustrated in FIG. 16 via the controller 502.

Examples of table information of the third table-information table include a table ID and a storage location of a table object that are similar to those of the first table-information table illustrated in FIG. 7 and header presence/absence information that indicates presence or absence of a header of each table object.

The table information storage part 500 also stores the first table-information table illustrated in FIG. 7 and the second table-information table illustrated in FIG. 13 in accordance with selection of the first and second exemplary embodiments by the selecting part 506.

The controller 502 controls each component.

Like the table scanning part 306 illustrated in FIG. 6, the table scanning part 504 scans table objects input from a ruled-line correction processing unit 214 (FIG. 5), acquires storage locations of the table objects, and assigns table IDs to the respective table objects.

The table scanning part 504 also accesses a storage location of a table object to acquire the table object. For example, when a first row or a first column of the table object has a format different from that of other rows or columns, the table scanning part 504 determines that a header exits. Otherwise, the table scanning part 504 determines that the header is absent. In this way, the table scanning part 504 generates the header presence/absence information.

The table scanning part 504 adds the assigned table IDs, the acquired storage locations, and the generated header presence/absence information to the third table-information table stored in the table information storage part 500 via the controller 502.

The selecting part 506 selects a table connection method in accordance with the header presence/absence information of the third table-information table stored in the table information storage part 500 under control of the controller 502.

More specifically, for example, as a second table-information table, the selecting part 506 outputs, to the table information storage part 500 via the controller 502, pieces of the table information of table objects having consecutive table ID values and the header presence/absence information indicating presence of the header out of pieces of the table information of the third table-information table.

Additionally, for example, as a first table-information table, the selecting part 506 outputs, to the table information storage part 500 via the controller 502, pieces of table information of table objects having consecutive table ID values and the header presence/absence information indicating absence of the header out of the pieces of the table information of the third table-information table.

First Modification

In the first to third exemplary embodiments of the present invention, the first to third table drawing processing units 30, 40, and 50 perform the processing for table connection on all of table objects subjected to the process and then connect the table objects to generate table drawing data. However, the process for table connection may be performed on each table object one by one.

Second Modification

In the first to third exemplary embodiments of the present invention, the table connection determining process and the table connecting process are performed on table objects in the order in which image data including the table objects are read. However, for example, when a page number is printed on each of plural paper documents as illustrated in FIG. 3B and FIG. 11A, the page number may be recognized from the read image data and the processes may be performed on the table objects in accordance with the page number.

Third Modification

In the first to third exemplary embodiments of the present invention, the first and second table connecting parts 312 and 412 perform the table connecting process (FIGS. 8, 9, and 14) on table objects on the basis of the connection ID added to the table-information table by the first and second table connection determining parts 310 and 410, respectively. However, for example, a result of the table connecting determining process may be displayed to users before the table connection process is performed. The table connecting process may be performed after a table connection instruction is received from the users.

Fourth Modification

In the first to third exemplary embodiments of the present invention, the first and second table connection determining parts 310 and 410 perform the table connection determining process on table objects separated by the object separating unit 204 (FIG. 5). However, the table connection determining process may be performed with reference to image data from which the table objects have not been separated as well as the table objects.

More specifically, for example, when determining that other objects (such as of a text, CG, and a photo) are included between a first table object and a second table object, the first and second table connection determining parts 310 and 410 determine that the first and second table objects are not to be connected even if the first and second table objects have the matching table structure and the matching header information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus configured to acquire a plurality of tables by acquiring a table from each image data of a plurality of image data arranged in a predetermined order, the image processing apparatus comprising:
a header acquiring part that acquires a header, which is at least one of a column and a row of a table, from each of the plurality of tables;
a table connection determining part that determines, as a set of tables to be connected, tables of the plurality of tables that are adjacent to each other in the predetermined order and that have headers that match one another, the set of tables including a first table from a first piece of image data of the plurality of pieces of image data in the predetermined order and one or more second tables;
a table connecting part that deletes the header from each table of the one or more second tables that match the first header and does not delete the header of the a first table and connects the first table having the matching header and the one or more second tables that do not have headers in accordance with the predetermined order.

2. The image processing apparatus according to claim 1, wherein the header of each table is located on an end row of that table, and
wherein the table connecting part connects the first table and the one or more second tables, from each of which the end row including the header has been deleted, to each other in a downward direction from table to table in accordance with the predetermined order.

3. The image processing apparatus according to claim 2, wherein the end row of each table includes a first row of that table.

4. The image processing apparatus according to claim 1, wherein the header of each table is located on an end column of that table, and
wherein the table connecting part connects the first table and the one or more second tables, from each of which the end column including the header has been deleted, to each other in a rightward direction from table to table in accordance with the predetermined order.

5. The image processing apparatus according to claim 4, wherein the end column of each table includes a leftmost column of that table.

6. The image processing apparatus according to claim 1, wherein when the pieces of image data including the adjacent tables further include a non-table component located between the adjacent tables, the table connection determining part determines that the adjacent tables are not to be connected.

7. The image processing apparatus according to claim 1, wherein the plurality of pieces of image data are generated from paper documents by reading images of the paper documents.

8. The image processing apparatus according to claim 7, wherein the predetermined order includes an order in which the paper documents are read.

9. The image processing apparatus according to claim 1, wherein each of the plurality of pieces of image data includes order information that identifies an arrangement order, and
wherein the predetermined order represents an order specified by the order information.

10. The image processing apparatus according to claim 1, further comprising an image receiving part that receives the plurality of pieces of image data from a plurality of documents.

11. An image processing method comprising:
acquiring a plurality of tables by acquiring a table from each image data of a plurality image data arranged in a predetermined order;
acquiring a header, which is at least one of a column and a row of a table, from each of the plurality of tables;
determining, as a set of tables to be connected, tables of the plurality of tables that are adjacent to each other in the predetermined order and that have headers that match one another, the set of tables including a first table from a first piece of image data of the plurality of pieces of image data in the predetermined order and one or more second tables;
deleting the header from each table of the one or more second tables and not deleting the header of the first table; and
connecting, using a processor, the first table having the header and the one or more second tables that do not have headers in accordance with the predetermined order.

12. A non-transistory computer readable medium storing a program causing a computer to execute a process for image processing, the process comprising:
acquiring a plurality of tables by acquiring a table from each image data of a plurality image data arranged in a predetermined order;
acquiring a header, which is at least one of a column and a row of a table, from each of the plurality of tables;
determining, as a set of tables to be connected, tables of the plurality of tables that are adjacent to each other in the predetermined order and that have headers that match one another, the set of tables including a first table from a first piece of image data of the plurality of pieces of image data in the predetermined order and one or more second tables;
deleting the header from each table of the one or more second tables and not deleting the header of the first table; and
connecting the first table having the header and the one or more second tables that do not have headers in accordance with the predetermined order.

13. An image processing apparatus comprising:
an image receiving unit that acquires first image data corresponding to a first page including a first table, and second image data corresponding to a second page including a second table, the first page including a first header, which is at least one of a column and a row of the first table, the second page including a second header, which is at least one of a column and a row of the second table;
a table connection determining part that determines whether the first table and the second table are a set of tables to be connected by determining whether the first header matches the second header; and
a table connecting part, which if the table connection determining part determines that the first table and the second table are the set of tables to be connected, deletes the second header that matches the first header from the second table and does not delete the first header from the first table and connects a beginning of the second table to an end of the first table.

14. The image processing apparatus according to claim 13, wherein in determining whether the first table and the second table are a set of tables to be connected, the table connection determining part further determines whether the first page and the second page are adjacent to one another.

\* \* \* \* \*